United States Patent [19]

Lagnemo et al.

[11] Patent Number: 5,336,433
[45] Date of Patent: Aug. 9, 1994

[54] BLEACHING AGENT

[75] Inventors: Hans Lagnemo, Göteborg, Sweden; Robert E. Sparks, Kirkwood; Irwin C. Jacobs, Eureka, both of Mo.

[73] Assignee: Eka Nobel AB, Bohus, Sweden

[21] Appl. No.: 891,735

[22] Filed: Jun. 8, 1992

[51] Int. Cl.$^5$ .............................................. C11D 17/06
[52] U.S. Cl. .......................... 252/186.23; 252/186.26; 252/186.44; 428/403
[58] Field of Search ...................... 252/186.26, 186.23, 252/186.44; 428/403

[56] References Cited

U.S. PATENT DOCUMENTS

| 3,975,280 | 8/1976 | Hachmann et al. | 252/102 |
| 3,979,318 | 9/1976 | Tokiwa et al. | 252/186.22 |
| 4,126,573 | 11/1978 | Johnston | 252/99 |
| 4,675,140 | 6/1987 | Sparks et al. | 264/4.3 |

FOREIGN PATENT DOCUMENTS

| 1423536 | 2/1976 | Canada . |
| 0382464 | 8/1990 | European Pat. Off. . |
| 2365268 | 7/1975 | Fed. Rep. of Germany . |
| 2406410 | 8/1975 | Fed. Rep. of Germany . |
| 2406454 | 8/1975 | Fed. Rep. of Germany . |
| 2406455 | 8/1975 | Fed. Rep. of Germany . |
| WO89/10117 | 11/1989 | PCT Int'l Appl. . |
| WO91/17143 | 11/1991 | PCT Int'l Appl. . |

Primary Examiner—Robert L. Stoll
Assistant Examiner—Valerie Fee
Attorney, Agent, or Firm—Burns, Doane, Swecker & Mathis

[57] ABSTRACT

The present invention relates to particles having a core comprising a peroxy compound and a hydrophobic coating comprising:

(a) a hydrophobic substance selected from saturated fats, waxes or phosphatides;
(b) a surfactant dissolved in the hydrophobic substance;
(c) water swellable grains;

the hydrophobic substance and the surfactant being substantially inert in respect of the peroxy compound.

The invention also relates to preparation and use of the particles. Further, the invention relates to a composition containing such coated particles.

15 Claims, No Drawings

BLEACHING AGENT

The present invention relates to particles having a core of a peroxy compound and a coating comprising a hydrophobic substance, a surfactant, and water swellable grains. The invention also relates to preparation and use of the particles. Further, the invention relates to a composition containing such coated particles.

Detergent compositions often contain peroxy compounds as bleaching agents. However, many peroxy compounds are unstable in detergent compositions since their decomposition is catalyzed by metal cations moving comparatively freely through the water present in the detergent. Further, the decomposition is also facilitated by other components commonly present in detergents, for example zeolite or bleaching activators such as TAED (tetraacetylethylene diamine) or TAGU (tetraacetylglucoluril). Therefore, storage of a detergent, even at room temperature and normal humidity, involves decomposition of peroxy compounds therein.

It is known that active agents in a detergent can be preserved by a protective coating. However, since bleaching agents in a detergent must dissolve rapidly in the washing machine, it is a great problem to find a coating composition showing a satisfactory rate of dissolution at the same time as it provides sufficient protection of peroxy compounds. Since many washing machines are fed with cold water, it is desirable that the dissolution occurs rapidly even at temperatures as low as about 5° to 10° C.

DE patent specification 2365268 discloses a washing agent additive comprising active particles coated with a fatty acid or alcohol, a surfactant, and a water swellable compound. Such particles are also disclosed in DE patent specifications 2406454 and 2406455.

Alkali metal carbonate peroxy hydrate, known as percarbonate, is a very. environmental friendly bleaching agent, resulting only in carbonates at washing. It is, however, very unstable and it has until now been impossible to provide a storage stable, commercially useful detergent composition containing percarbonate. For instance, the coating disclosed in the above mentioned patents would cause hydrolyses of percarbonate during storage.

Through the present invention it has been found possible to provide storage stable particles having a core comprising a peroxy compound and a hydrophobic coating, which particles are readily soluble in cold water. According to the invention the coating comprises:
(a) a hydrophobic substance selected from saturated fats, waxes or phosphatides;
(b) a surfactant dissolved in the hydrophobic substance;
(c) water swellable grains;
the components in the coating being substantially inert in respect of the peroxy compound.

All kinds of peroxy compound such as hydrogen peroxide generating substances, for example mono- and tetra hydrate of alkali metal perborate, alkali metal persulfate or alkali metal carbonate peroxy hydrate (i.e. percarbonate), or percarboxylic acids or percarboxylic acid generating substances, for example diacylated dipercarboxylic acids, may be provided with such a coating. The invention is particularly advantageous in respect of particles having a core comprising percarbonate of an alkali metal such as sodium, potassium or mixtures thereof, or a core comprising a diacylated dipercarboxylic acid. Diacylated dipercarboxylic acids refer to compounds described in PCT patent publication WO 91/17143.

In most cases, it is preferred that the core substantially consists of a peroxy compound such as alkali metal percarbonate, but some peroxy compounds such as diacylated dipercarboxylic acids should be mixed with a phlegmatic agent, i.e. an inert substance, the content of which preferably being from about 50 to about 90% by weight of the core.

Preferably, the coating constitutes from about 1 to about 90% by weight, most preferably from about 5 to about 70% by weight of the particles. The optimal amount of coating depends on the peroxy compound in the core. The particles may for example contain from about 80 to about 99% by weight, preferably from about 85 to about 95% by weight of alkali metal percarbonate, the balance preferably substantially consisting of the hydrophobic coating. If the particles comprise diacylated dipercarboxylic acids the amount of coating is preferably higher. The preferred diameter of the particles is from about 10 to about 2000 $\mu$m, most preferably from about 100 to about 1000 $\mu$m.

The hydrophobic coating preferably contains from about 50 to about 95% by weight, most preferably from about 60 to about 80% by weight of the hydrophobic substance. Further, it preferably contains from about 2 to about 50% by weight, most preferably from about 5 to about 30% by weight of surfactants. Finally, it suitably contains from about 2 to about 50% by weight, preferably from about 5 to about 40% by weight, most preferably from about 10 to about 30% by weight of water swellable grains.

The hydrophobic component of the coating must be inert in respect of the peroxy compound and provide protection against water soluble substances such as metal cations. It should not contain highly hydrophilic groups such as carboxylic acids, and substantially all carbon-carbon bonds should preferably be saturated. It should preferably have a melting point within the range from about 30° to about 100° C., preferably from about 40° to about 90° C. If the melting point is too high, it will be difficult to avoid decomposition of the peroxy compound during the coating procedure, and if it is too low, a detergent containing the particles will be subject to caking during storage at normal temperatures. It is also desirable that the hydrophobic substance is inexpensive and environmental friendly. Suitably, the hydrophobic substance is selected from naturally occurring sources such as animal or vegetable fats which can be prepared to very low costs, and if necessary be converted to saturated fats by catalytic hydrogenation. Examples of preferred fats from animal sources are hydrogenated tallow, lard, or mixtures thereof. Examples of preferred fats from vegetable sources are hydrogenated oils of rape, linseed, castor, soya, palm, coconut, sunflower, or mixtures thereof. Particularly preferred fats are selected from hydrogenated tallow, hydrogenated castor oil, hydrogenated rape oil and mixtures thereof. Although fats are preferred, it is possible to use waxes with suitable melting point, for example hydrocarbon waxes or esters from straight chained carboxylic acids preferably having from 24 to 36 carbon atoms with straight chained alcohols preferably having from 16 to 36 carbon atoms. It is also possible to use phosphatides such as lecithin or kephalin.

In order to reinforce the hydrophobic coating and improve its moisture-barrier properties, it is also possible to include synthetic polymers such as polyethylene, ethyl cellulose, ethylene vinyl acetate copolymers or ethylene acrylic acid copolymers, for example in an amount from about 0.1 to about 20% by weight.

The water swellable grains should be distributed throughout the coating. It is advantageous if the grains are as small as possible and they should preferably have a diameter less than about 100 μm, most preferably less than about 50 μm. There is no lower limit and the diameter may well be down to about 1 μm or smaller.

The water swellable grains should be of a substance insoluble in the hydrophobic substance but having capability of expanding in cold water before it optionally dissolves. Such expansion of the grains will break the hydrophobic coating and thereby facilitate rapid dissolution of the peroxy compound. In order to secure rapid dissolution of the peroxy compound, the degree and the rate of expansion in cold water are important properties of the substance used for the grains. It is also preferred that the substance in the grains is environmental friendly and inexpensive. Preferred substances come from natural sources and may include guar gum, karaya gum, gelatin, carageenan, alginates, or derivates of sugar, cellulose and starch, alone or in mixtures. Preferred sugar derivates comprise disaccharides such as saccharose, maltose, cellobiose and lactose. Useful poly saccharides include agar, starch, cellulose and derivates thereof, such as carboxy methyl cellulose (CMC). Cold water soluble starch or starch derivates are particularly preferred and can for example be chosen from products sold under the trademarks C3-444 STARCH® or SRA-POL 560® which are high molecular hydroxy propyl di-starch phosphates. It is, however, also possible to use water swellable synthetic polymers such as poly carboxylates, poly acrylic amides or mixtures thereof, for example NALCO 1181® which is a crosslinked poly acrylic acid.

The surfactants in the coating should be comparatively inert in respect of the peroxy compound in the core. Further, they should be soluble in the hydrophobic substance used. In order to maximize the dissolution rate of the particles the surfactants must however not be too hydrophobic. The suitable HLB value depends on the hydrophobic substance used, but normally it is within the range from about 10 to about 20, preferably from about 15 to about 18. In order to facilitate the coating procedure, the melting point suitably is within the range from about 20° to about 90° C., preferably from about 30° to about 70° C.

Preferred surfactants are the nonionic ones, particularly ethylene oxide derivates of alcohols, phenols, carbonic acids or amines. A preferred surfactant comprises a carbon chain having from 8 to 50 carbon atoms and is ethoxylated with from 2 to 80 ethylene oxide monomers. The most preferred surfactants are selected from ethoxylates of fatty alcohols, alkyl phenols, amines and fatty acids. Another useful group of nonionic surfactants includes alkyl poly glycosides, preferably comprising an alkyl chain having from 10 to 30 carbon atoms, the degree of polymerization preferably being from 1 to 3.

It is also possible to use some anionic surfactants such as fatty alcohol sulfates and fatty alcohol ether sulfates, the fatty alcohol preferably being saturated and having from 12 to 18 carbon atoms, the optional ether group preferably having from 1 to 4 ethoxide units. Other useful anionic surfactants include alkyl benzene sulfonates comprising alkyl groups having from 9 to 14 carbon atoms, olefin sulfonate and olefin ether sulfonate from primary olefines having from 12 to 18 carbon atoms.

It is also possible to include inert, comparatively water soluble organic polymers into the hydrophobic coating. Examples of such polymers are poly ethylene glycol, poly propylene glycol, poly ethylene imine, poly vinyl alcohol, poly vinyl pyrrolidone, poly methacrylic acid or poly methacrylic amide. These substances facilitate breakage of the hydrophobic coating. Other inert, water soluble organic or inorganic substances may also be used for the above purpose.

When particles according to the invention comes into contact with water, such as an alkaline detergent solution, the water swellable grains start absorbing water, thus expanding and breaking the tight hydrophobic coating. The surfactants dissolved in the hydrophobic substance increase the rate of water absorption considerably. When the coating has broken, the peroxy compound in the core comes into contact with the water and dissolves therein. Thus, it has been found possible to provide particles with a tight hydrophobic coating protecting a peroxy compound against water and water soluble substances occurring in a detergent composition, which coating however easily breaks when the particles are brought into water even at low temperatures.

The particles according to the invention can be prepared with any coating method not causing decomposition of the peroxy compound. The method may comprise preparation of a suspension of the coating components and the core substance including the peroxy compound, and formation of coated particles therefrom. The suspension may, for example, be prepared by melting the hydrophobic substance, dissolving the surfactant therein, and dispersing the water swellable grains and the core substance therein. The formation of coated particles may, for example, include rolling, granulation, or passing the suspension through a nozzle which may be stationary or moving, for example rotating. It is also possible to supply a suspension of the coating composition, for example by spraying, to particles of the core substance, for example in a pan or a fluid-bed. It is important that the temperature never exceeds the decomposition temperature of the peroxy compound, the highest permitted temperature thus normally being about 90° to about 100° C.

A preferred method of preparing particles having a core comprising a peroxy compound and a hydrophobic coating comprises the steps of:

(a) forming a fluid suspension containing a hydrophobic substance selected from saturated fats, waxes or phosphatides, a surfactant dissolved therein, water swellable grains and a core substance comprising a peroxy compound, the hydrophobic substance, the surfactant and the water swellable grains being substantially inert in respect of the peroxy compound;

(b) forming droplets from said suspension, said droplets comprising the core substance and a coating containing the hydrophobic substance, the surfactant and the water swellable grains;

(c) solidifying the coating material so to obtain solid particles.

The suspension is preferably formed by melting the hydrophobic substance, dissolving the surfactant therein and dispersing the water swellable grains and the core substance therein. The droplets may be formed by feeding the suspension to a rotating disc, and the droplets obtained may be solidified by active or passive cooling. The above method can be performed continuously and is particularly suitable for coating peroxy compounds sensible for decomposition such as percarbonate. Suitable equipment for performing the method is described in U.S. Pat. No. 4,675,140. Regarding suitable and preferred substances in the coating and the core, the above description of the particles are referred to.

The invention further concerns use of the described particles containing a peroxy compound and a hydrophobic coating as a bleaching agent, preferably in connection with washing of textiles or dishwashing. The washing water may be supplied with particles according to the invention being included in a detergent or being in the form of a separate bleaching powder. Preferably, alkaline washing water is supplied with particles in an amount so to obtain from about 0.001 to about 1 gram active oxygen per liter, which for example corresponds to from about 0.015 to about 6 grams sodium percarbonate.

Finally, the invention concerns a composition containing an inert filler, and/or one or several substances active at washing, which composition further contains particles comprising a peroxy compound and a hydrophobic coating according to the invention, for example in an amount from about 1 to about almost 100% by weight. The composition may comprise a mixture of particles containing different kinds of peroxy compounds. The substances active at washing may include detergent builders, surfactants, alkali generating substances, bleaching activators, or any other substances commonly used in detergents. The detergent builder may for example be selected from phosphates, zeolites, polycarboxylates, citrates, or mixtures thereof. The surfactants are preferably selected from anionic surfactants, nonionic surfactants, soaps or mixtures thereof. Anionic surfactants may for example be selected from linear alkylbenzene sulfonates, secondary alkane sulfonates, alcohol-ethoxysulfates or alpha-olefine sulfonates. Nonionic surfactants may for example be selected from alkoxylated compounds such as fatty alcohols, alkylphenols and alkylamines. Soaps may for example be selected from sodium or potassium salts of tallow. Also cationic surfactants such as quaternary ammonium compounds or imide azolinium salts, as well as amphoteric surfactants might be used. Alkali generating substances may for example be selected from carbonates, silicates, phosphates or mixtures thereof. The bleaching activators may for example be selected from TAED, TAGU, SNOBS (sodium nonoyl benzene sulfonate) or PAG (penta acetyl glucose). The filler may include any inert substance such as sodium sulfate. The peroxy compound in the particles according to the invention may for example be a hydrogen peroxide generating substance such as alkali metal percarbonate, a percarboxylic acid, or a percarboxylic acid generating substance such as a diacylated dipercarboxylic acid. The composition may constitute a complete detergent or a bleaching powder to be added separately at washing.

A complete detergent for washing of textiles suitably contains from about 2 to about 30% by weight, preferably from about 10 to about 20% by weight of particles according to the invention. Further, the detergent suitably contains a detergent builder, for example from about 10 to about 45% by weight, surfactants, for example from about 5 to about 35% by weight and an alkali generating substance, for example from about 5 to about 20% by weight. Preferably, the detergent contains from about 5 to about 20% by weight of anionic surfactants, from about 2 to about 15% by weight of nonionic surfactants, and from about 0.1 to about 5% by weight of soaps. The detergent may also contain bleaching activators, for example from about 1 to about 10% by weight, complexing agents such as phosphonates or EDTA, for example from about 0.1 to about 1% by weight, and fillers such as sodium sulfate, for example from about 5 to about 50% by weight. Additionally, the detergent may contain conventional components such as water glass, carboxy methyl cellulose, enzymes, foam regulators, perfumes, couloring agents, optical brighteners and water. The detergent can be prepared with conventional methods such as dry mixing, agglomeration or spray drying. If the preparation involves spray drying, any heat sensible component, such as particles comprising peroxy compounds according to the invention, should be added to the dried material.

A separate bleaching powder may comprise up to almost 100% by weight of particles containing peroxy compounds according to the invention, but preferably the content is from about 5 to about 90% by weight. The bleaching powder may comprise only one peroxy compound or a mixture of particles containing different kinds of peroxy compounds. It is advantageous if a hydrogen peroxide generating substance such as percarbonate, for example from about 10 to about 75% by weight, is used in combination with a bleaching activator such as TAED or TAGU, for example from about 2 to about 25% by weight. Also other bleaching activators such as a diacylated dipercarboxylic acid may be used, for example in an amount from about 2 to about 25% by weight. A bleaching powder may also contain detergent builders, for example from about 5 to about 90% by weight, surfactants, for example up to about 10% by weight, enzymes, for example up to about 2% by weight, or fillers, for example from about 5 to about 90% by weight. A preferred bleaching powder consists essentially of from about 30 to about 75% by weight of particles containing percarbonate, from about 10 to about 25% by weight of a bleaching activator, the balance preferably substantially being detergent builders, fillers, surfactants, water or mixtures thereof.

A detergent for dishwashing may be in the form of a low alkaline detergent (pH of washing water intended to be about 10–11) suitably containing from about 2 to about 15% by weight of a bleaching agent comprising coated particles according to the invention, such as coated sodium percarbonate, from about 5 to about 50% by weight of alkali metal disilicate, from 0 to about 40% by weight of alkali metal carbonate, from about 15 to about 50% by weight of builders such as sodium citrate and polycarboxylates or sodium tri polyphosphate (STPP), from about 0.5 to about 5% by weight of low foaming nonionic surfactants, from about 0.5 to about 5% by weight of enzymes and from about 1 to about 6% by weight of bleaching activators such as TAED. A dishwasher detergent may also be high alkaline (pH of washing water intended to be about 11–12) having a similar composition as the low alkaline detergent, the disilicate however being replaced with from about 20 to about 80% by weight of alkali metal meta silicate and the builder preferably substantially consisting of STPP.

The invention will now be described through the following examples. If not otherwise stated, all contents an percentages refer to content and percent by weight.

EXAMPLE 1

Sodium percarbonate was encapsulated according to the following method: A hydrophobic fat was melted and a surfactant was dissolved therein. Sodium percarbonate and water swellable particles were dispersed therein. The suspension formed was supplied to a disc with a diameter of about 25 cm and rotating with about 6000 to 10000 rpm. Upon being thrown from the rotating surface by the centrifugal force, the droplets formed were solidified by exposure to the air. The particles containing percarbonate particles were collected. As hydrophobic substances hydrogenated tallow (referred to as T) and hydrogenated castor oil (referred to as C) were used. The following nonionic surfactants were used: Unitbox 480 ® (referred to as U) (a long chained ethoxylated fatty alcohol, molecular weight about 2125, comprising about 80 weight percent of added ethylene oxide, HLB 16), Brij 58 ® (referred to as Br) (a 20 mol ethylene oxide adduct of cetyl alcohol, HLB 15.7), Berol 064 ® (referred to as B64) (a 6 mol ethylene oxide adduct of $C_{16}$–$C_{18}$ alcohol, HLB 9.9 ) and Berol 065 ® (referred to as B65) (a 10 mol ethylene oxide adduct of $C_{16}$–$C_{18}$ alcohol, HLB 12.6). As water swellable grains Nalco 1181 ® (referred to as N) (cross-linked polyacrylic acid with a particle diameter less than 45 μm) and SRA-POL 560 ® (referred to as SRA) (high molecular hydroxy propyl di-starch phosphate with a particle diameter less than 50 μm) were used. The table below shows the composition of the coating in percent by weight based on the coating and the payload (the amount of the core substance) in percent by weight based on the whole particle, for the different samples.

| Sample No. | Hydrophobic | | Surfactant | | | | Swellable | | Payl. |
|---|---|---|---|---|---|---|---|---|---|
| | T | C | U | Br | B64 | B65 | N | SRA | |
| 1 | 72 | | 18 | | | | 10 | | 92.5 |
| 2 | 72 | | 18 | | | | | 10 | 73.0 |
| 3 | 85 | | | | | | | 15 | 88.0 |
| 4 | 80 | | | 15 | | | 5 | | 83.8 |
| 5 | 70 | | | 15 | | | | 15 | 87.8 |
| 6 | 70 | | | | 15 | | | 15 | 90.9 |
| 7 | 85 | | | | | 5 | | 10 | 87.9 |
| 8 | 80 | | 10 | | | | 10 | | 90.3 |
| 9 | | 72 | 18 | | | | 10 | | 84.9 |
| 10 | 75 | | 10 | | | | | 15 | 86.0 |

2 grams product from each sample were dissolved in 1 liter de-ionized water at 20° C. The dissolution was followed by measuring the conductivity in the water. The results appear in the table below. Number 11 is pure sodium percarbonate, used as a reference sample.

| Sample No. | Conductivity (mV) after | | |
|---|---|---|---|
| | 5 min. | 15 min. | 25 min. |
| 1 | 18 | 41 | 48 |
| 2 | 28 | 41 | 44 |
| 3 | 8 | 25 | 35 |
| 4 | 10 | 25 | 36 |
| 5 | 15 | 36 | 43 |
| 6 | 15 | 33 | 44 |
| 7 | 13 | 30 | 40 |
| 8 | 13 | 27 | 36 |
| 9 | 23 | 42 | 49 |
| 10 | 43 | 52 | 52 |
| 11 | 56 | 56 | 56 |

EXAMPLE 2

Product from the samples 1, 5, 10 and 11 prepared in example 1 was used as a bleaching agent for washing of presoiled pieces of cloth with IEC-Z standard detergent (Henkel, consisting of 6.4% linear sodium alkyl benzenesulfonate, 2.3% sodium-soap, 35% sodium triphosphate, 6% sodium waterglass (ratio 3.3), 1.5% magnesium silicate, 1.0% carboxy methyl cellulose, 0.2% EDTA, 0.2% optical brightener (stilbene type), 16.8% sodium sulfate, 7.8% water). The experiments were performed at 40° and 60° C. in a washing machine fed with 16 liters of water, the program taking 45 minutes. In each experiment 80 grams IEC-Z and particles comprising 10.3 grams sodium percarbonate were used. In the experiments at 40° C. also 3.4 grams TAED were added. Number 12, however, is pure IEC-Z used for reference purposes. The following types of presoiled cloth were used: EMPA 114 (cotton soiled with red wine), WFK 10G (cotton soiled with tea) and EMPA 117 (cotton-polyester soiled with blood, milk and Indian ink). The brightness of each piece was determined prior to and after the washing with a reflectance meter at a wave-length of 457 nm, whereupon the differences were transformed to percent bleaching effect. The results are shown in the table below.

| Sample No. | Temp. (°C.) | Bleaching effect (%) | | |
|---|---|---|---|---|
| | | EMPA 114 | WFK 10G | EMPA 117 |
| 1 | 40 | 50 | 20 | 74 |
| 1 | 60 | 61 | 30 | 65 |
| 5 | 40 | 49 | 18 | 69 |
| 5 | 60 | 59 | 27 | 68 |
| 10 | 40 | 49 | 19 | 60 |
| 10 | 60 | 59 | 26 | 56 |
| 11 | 40 | 52 | 19 | 62 |
| 11 | 60 | 62 | 26 | 56 |
| 12 | 40 | 30 | 8 | 77 |
| 12 | 60 | 35 | 13 | 74 |

EXAMPLE 3

2 grams product from the samples 1 and 3–11 prepared in example 1 were mixed with 8 grams IEC-Z standard detergent. The mixtures were stored in sealed containers at 40° C., the relative humidity in the containers being about 50%. The content of active oxygen (AO) in each sample were measured initially and after 8 weeks through titration with permanganate. The table below shows the amount of active oxygen remaining after 8 weeks storage of each sample.

| Sample No. | Remaining AO (%) |
|---|---|
| 1 | 97 |
| 3 | 93 |
| 4 | 98 |
| 5 | 96 |
| 6 | 91 |
| 7 | 96 |
| 8 | 90 |
| 9 | 95 |
| 10 | 97 |
| 11 | 45 |

The examples above show that it is possible to prepare encapsulated percarbonate which has almost the same bleaching effect at washing as untreated percarbonate. It has also been shown that untreated percarbonate in a detergent composition decompose to a great extent during storage, while percarbonate encapsulated according to the invention is essentially stable.

We claim:

1. A particle comprising a peroxy compound core with a hydrophobic coating, said coating comprising:
   (a) a hydrophobic substance selected from the group consisting of a saturated fat, a wax, a phosphatide and combination thereof;
   (b) a surfactant dissolved in the hydrophobic substance; and
   (c) water-swellable grains;
   wherein the components (a), (b) and (c) in the coating are substantially inert with respect to the peroxy compound.

2. A particle as claimed in claim 1, wherein the core comprises alkali metal carbonate peroxyhydrate.

3. A particle as claimed in claim 2, wherein the hydrophobic substance has a melting point within the range from about 30° to about 100° C.

4. A particle as claimed in claim 2, wherein the hydrophobic substance is hydrogenated animal or vegetable fat.

5. A particle as claimed in claim 2, wherein the water swellable grains are insoluble in the hydrophobic substance and have capability of expanding in water having a temperature as low as about 5° C.

6. A particle as claimed in claim 1, wherein the hydrophobic substance has a melting point within the range from about 30° to about 100° C.

7. A particle as claimed in claim 1, wherein the hydrophobic substance is hydrogenated animal or vegetable fat.

8. A particle as claimed in claim 7, wherein the hydrophobic substance is hydrogenated tallow, hydrogenated castor oil or hydrogenated rape oil.

9. A particle as claimed in claim 1, wherein the water swellable grains are insoluble in the hydrophobic substance and have capability of expanding in water having a temperature as low as about 5° C.

10. A particle as claimed in claim 1, wherein the water-swellable grains comprise guar gum, a sugar, cellulose or starch derivative, or a polycarboxylate or polyacrylic amide.

11. A particle as claimed in claim 1, wherein the water-swellable grains have a diameter less than about 50 µm.

12. A particle as claimed in claim 1, wherein the hydrophobic coating contains from about 50 to about 95% by weight of the hydrophobic substance, from about 2 to about 50% by weight of surfactants, and from about 5 to about 40% by weight of water-swellable grains.

13. A method for bleaching an article, comprising contacting the article with a bleaching agent, wherein the bleaching agent comprises a plurality of particles each having a peroxy compound core within a hydrophobic coating, said coating comprising:
   (a) a hydrophobic substance selected from the group consisting of a saturated fat, a wax, a phosphatide and mixtures thereof;
   (b) a surfactant dissolved in the hydrophobic substance; and
   (c) water-swellable grains;
   wherein the components (a), (b) and (c) in the coating are substantially inert with respect to the peroxy compound.

14. A bleaching composition containing at least one of an inert filler and a substance active at washing, and further containing a plurality of particles each having a peroxy compound core within a hydrophobic coating, said coating comprising:
   (a) a hydrophobic substance selected from the group consisting of a saturated fat, a wax, a phosphatide and mixtures thereof;
   (b) a surfactant dissolved in the hydrophobic substance; and
   (c) water-swellable grains;
   wherein the components (a), (b) and (c) in the coating are substantially inert with respect to the peroxy compound.

15. A composition as claimed in claim 14, wherein the peroxy compound core comprises alkali metal carbonate peroxyhydrate.

* * * * *